United States Patent
Kazmi et al.

(10) Patent No.: US 8,411,553 B2
(45) Date of Patent: Apr. 2, 2013

(54) METHOD AND APPARATUS FOR TESTING MOBILE TERMINALS IN AN OFDM SYSTEM

(75) Inventors: Muhammad Ali Kazmi, Bromma (SE); Joakim Axmon, Kävlinge (SE); Christian Bergljung, Lund (SE); Farshid Ghasemzadeh, Sollentuna (SE); Walter Muller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 689 days.

(21) Appl. No.: 12/472,430

(22) Filed: May 27, 2009

(65) Prior Publication Data
US 2009/0310492 A1  Dec. 17, 2009

Related U.S. Application Data

(60) Provisional application No. 61/061,290, filed on Jun. 13, 2008.

(30) Foreign Application Priority Data

Dec. 8, 2008 (WO) .................. PCT/SE2008/051421

(51) Int. Cl.
*H04J 11/00* (2006.01)
(52) U.S. Cl. ......... 370/208; 370/241; 370/329; 370/480
(58) Field of Classification Search ........................ None
See application file for complete search history.

(56) References Cited

U.S. PATENT DOCUMENTS

| | | | |
|---|---|---|---|
| 6,434,364 B1 * | 8/2002 | O'Riordain | 455/67.11 |
| 6,456,652 B1 | 9/2002 | Kim et al. | |
| 7,392,460 B2 * | 6/2008 | Kim et al. | 714/781 |
| 7,400,887 B2 * | 7/2008 | Azman et al. | 455/446 |
| 7,894,394 B2 * | 2/2011 | Kim et al. | 370/329 |
| 7,933,287 B2 | 4/2011 | Toda et al. | |
| 8,027,297 B2 * | 9/2011 | Kim et al. | 370/329 |
| 8,121,081 B2 * | 2/2012 | Grob-Lipski | 370/329 |

(Continued)

FOREIGN PATENT DOCUMENTS

| | | |
|---|---|---|
| EP | 1906569 A1 | 4/2008 |
| JP | 2003224534 A | 8/2003 |

(Continued)

OTHER PUBLICATIONS

Nokia, "TSG-RAN Working Group 4 (Radio) meeting #13: Inclusion of OCNS Definition for Performance Tests," Sep. 4-8, 2000, pp. 1-6, Turin, Italy.

(Continued)

*Primary Examiner* — Hassan Kizou
*Assistant Examiner* — Roberta A Shand
(74) *Attorney, Agent, or Firm* — Coats & Bennett, P.L.L.C.

(57) ABSTRACT

The present invention relates to a method and apparatus for testing mobile terminals in an OFDMA system, in which all or part of available downlink radio resources in a cell are transmitted. A processing unit in a test apparatus splits the resources used for transmission into contiguous unities in the frequency domain such that one or more of said unities comprise resources allocated to one or more mobile terminals under test, and at least one of said unities comprise resources allocated to virtual users.

22 Claims, 3 Drawing Sheets

U.S. PATENT DOCUMENTS

| | | | |
|---|---|---|---|
| 2005/0207333 A1* | 9/2005 | Rotstein et al. | 370/203 |
| 2006/0009160 A1* | 1/2006 | Craig | 455/67.11 |
| 2006/0120395 A1 | 6/2006 | Xing et al. | |
| 2006/0211427 A1* | 9/2006 | Azman et al. | 455/450 |
| 2007/0230356 A1* | 10/2007 | Kalantri et al. | 370/241 |
| 2007/0253381 A1* | 11/2007 | Bachl et al. | 370/338 |
| 2008/0090575 A1* | 4/2008 | Barak et al. | 455/444 |
| 2008/0132281 A1* | 6/2008 | Kim et al. | 455/562.1 |
| 2008/0160988 A1* | 7/2008 | Jami et al. | 455/423 |
| 2008/0310359 A1* | 12/2008 | McBeath et al. | 370/329 |
| 2009/0274109 A1* | 11/2009 | Zhang et al. | 370/329 |

FOREIGN PATENT DOCUMENTS

| | | |
|---|---|---|
| JP | 2005244651 A | 9/2005 |
| JP | 2007325111 A | 12/2007 |
| WO | 2007020995 A1 | 2/2007 |

OTHER PUBLICATIONS

3GPP TS 25.133.v7.12.0 (May 2008). Annex A, pp. 95-182. 3GPP, Valbonne Sophia Antipolis, France.

3GPP TS 25.101 V8.2.0 (Mar. 2008). Annex C, pp. 157-171. 3GPP, Valbonne Sophia Antipolis, France.

* cited by examiner

METHOD AND APPARATUS FOR TESTING MOBILE TERMINALS IN AN OFDM SYSTEM

RELATED APPLICATIONS

This application claims priority to International Application No. PCT/SE2008/051421 filed on Dec. 8, 2008, and to U.S. Provisional Application No. 61/061,290 filed on Jun. 13, 2008, the contents both of which are incorporated herein by reference in their entirety.

BACKGROUND

Different types of User Equipment, UE, performance requirements are specified in the standard. In order to ensure that UE meets these requirements, appropriate and relevant test cases are also specified. During the tests all the downlink radio resources are not typically needed for the user under test. In practical circumstances several users receive transmission simultaneously on different resources in a cell. To make the tests as realistic as possible these remaining channels or radio resources should be transmitted in a manner that mimics transmission to other users in a cell.

The objective of UE performance verification (or the so-called UE performance tests) is to verify that UE fulfils the desired performance requirements in a given scenario, conditions and channel environment. By desired performance requirements it is meant those specified in the standard or requested by an operator or by any prospective customer. The performance requirements span a very vast area of UE requirements, such as:

UE RF receiver requirements e.g. receiver sensitivity
UE RF transmitter requirements e.g. UE transmit power accuracy
UE demodulation requirements e.g. achievable throughput
Radio resource management requirements e.g. handover delay We can classify the UE verification into two categories:
Verification in lab
Verification in real network Verification in Lab In the verification in lab the base station is emulated by test equipment, which is often termed as system simulator. Thus all downlink transmission is done by the test equipment to the test UE. During a test all common and other necessary UE specific control channels are transmitted by the test equipment. In addition a data channel, e.g. PDSCH in E-UTRAN, is also needed to send necessary data and configure the UE. Furthermore typically a single UE is tested at a time. In most typical test cases the entire available downlink resources are not used by the UE. However to make test realistic the remaining downlink resources should also be transmitted to one or multiple virtual users.

In OFDMA system the transmission resources comprises of time-frequency resources called resource blocks, which are sent with some transmit power level, as described in more detail below. This type of resource allocation to generate load in OFDMA will be referred to as OFDM channel noise generator (OCNG) in the following. Thus OCNG is sent to a plurality of virtual users for loading the cell.

Verification in Real Network

These types of tests are demanded by the operators and are performed in a real network. The test may comprise of single or multiple UEs. Prior to the network roll out or in an early phase of deployment the traffic load is typically very low. In classical tests the cell load is generated by increasing transmission power on one or more common channels. However operators are now increasingly demanding the network vendors to generate cell load in realistic fashion for performing tests. This means resources, which are not allocated to the test users should be allocated to the virtual users emulating load in the cell. Thus either all or large part of available resources i.e. channels, transmit power etc is used in the tests. This requires base station to implement the ability to transmit remaining resources in order to generate load. Thus for OFDMA (i.e. in E-UTRAN) OCNG is also deemed to be implemented in an actual base station.

Noise Generation in WCDMA for UE Performance Verification

In WCDMA orthogonal channel noise simulator (OCNS) is used to load cells in the test. The OCNS is implemented in both test equipment and also possibly in the base station. In the former case it is standardized in TS 25.101 and TS 25.133 for each type of test or same for similar tests. The OCNS comprises of channelization code and relative power. In a CDMA system the position of channelization code in a code tree is sensitive to intra-cell interference. Therefore more careful selection of codes for OCNS and their power levels is needed. An example of OCNS from TS 25.101 for UE demodulation tests is quoted below:

TABLE 1

DPCH Channelization Code and relative level settings for OCNS signal

| Channelization Code at SF = 128 | Relative Level setting (dB) (Note 1) | DPCH Data (see NOTE 3) |
|---|---|---|
| 2 | −1 | The DPCH data for each |
| 11 | −3 | channelization code shall be |
| 17 | −3 | uncorrelated with each other and |
| 23 | −5 | with any wanted signal over the |
| 31 | −2 | period of any measurement. For |
| 38 | −4 | OCNS with transmit diversity the |
| 47 | −8 | DPCH data sent to each antenna |
| 55 | −7 | shall be either STTD encoded or |
| 62 | −4 | generated from uncorrelated |
| 69 | −6 | sources. |
| 78 | −5 | |
| 85 | −9 | |
| 94 | −10 | |
| 125 | −8 | |
| 113 | −6 | |
| 119 | 0 | |

NOTE 1: The relative level setting specified in dB refers only to the relationship between the OCNS channels. The level of the OCNS channels relative to the Ior of the complete signal is a function of the power of the other channels in the signal with the intention that the power of the group of OCNS channels is used to make the total signal add up to 1.
NOTE 2: The DPCH Channelization Codes and relative level settings are chosen to simulate a signal with realistic Peak to Average Ratio.
NOTE 3: For MBSFN, the group of OCNS channels represent orthogonal S-CCPCH channels instead of DPCH. Transmit diversity is not applicable to MBSFN which excludes STTD.

E-UTRAN Downlink Transmission

In E-UTRAN Orthogonal Frequency Division Multiplexing (OFDM) technology is used in the downlink, whereas DFT based pre-coded OFDM is used in uplink. In E-UTRAN the cell transmission bandwidth is divided into several time-frequency resources. Most of these resources comprise of resource blocks, which comprises of 0.5 ms (time slot) in time domain and 12 sub-carriers each of 15 kHz in frequency domain. However some of the resources used for common channels e.g. SCH channel (primary and synchronization sequences) or reference symbols are transmitted over one or more OFDM symbol in time domain in each sub-frame. Some other control signals such as PCFICH, PHICH and PDCCH are also sent in specific OFDMA symbol in each sub-frame. The resource blocks are used for transmitted user data or some control signaling e.g. paging, system information etc.

Furthermore E-UTRAN is a pure packet data designed cellular system, in which transmissions of user data in uplink and downlink always take place via shared channels. As similar to HSPA in UTRAN, the UE monitors physical downlink control channels (PDCCH) in order to access UE dedicated user data on the physical downlink shared channel (PDSCH) and the network assigns uplink scheduling grants to the UE on demand basis for uplink transmission via the physical uplink control channel (PUCCH) and the physical uplink shared channel (PUSCH). Error detection is provided on transport blocks and control payloads through Cyclic Redundancy Check (CRC) on PDSCH and PUSCH, and HARQ operations ensure efficient re-transmissions.

In E-UTRAN, no downlink transmit power control (TPC) has been specified and uplink TPC commands are embedded in the control payload mapped to PDCCH, which are sent occasionally or frequently by the E-UTRAN base station (eNodeB).

Downlink Physical Signals and Channels in E-UTRAN.

The physical layer signals and channels in E-UTRAN downlink are:
  Physical layer signals, i.e. reference signal (pilots) and synchronization signals;
  Physical broadcast channel (PBCH);
  PDCCH and PDSCH;
  Physical control format indicator channel (PCFICH); and
  Physical HARQ indicator channel (PHICH)
  Following observations can be made:
  Physical layer signals and PBCH are transmitted periodically;
  Error detection via CRC of transport blocks mapped to PBCH and PDSCH, and of control data mapped to PDCCH;
  Some uplink transmissions shall result in downlink responses through the physical channels PDCCH and PHICH.

The cell load is generated by OCNS in WCDMA, UTRAN TDD or other CDMA systems. The same concept is not needed in E-UTRAN since radio interface is based on OFDMA technology, which is less sensitive to intra-cell interference. But there is still some leakage across the subcarriers contributing to intra-cell interference due to transmitter and receiver imperfections. However inter-cell interference is not orthogonal and therefore it can still be considerable in OFDMA like in CDMA. Currently no rules on how to generate cell load for performing UE performance test are available for OFDMA systems.

SUMMARY

Thus, the objective of this invention is to define rules for loading the cell or test equipment based on OFDMA technology in the downlink for performing UE tests in realistic manner and according to well defined principles.

A first aspect of the present invention relates to a method for performing tests of mobile terminals or UEs designed to operate in an OFDMA system. During the test, all or part of available downlink radio resources in a cell of the OFDMA system are transmitted. One exemplary method comprises splitting said radio resources used for transmission into contiguous unities in the frequency domain such that one or more of said unities comprise radio resources allocated to one or more mobile terminals under test and at least one of said unities comprise radio resources allocated to virtual users. The method may further include transmitting test signals to the mobile terminals under test on the resources allocated to the mobile Since the mobile terminals under test only decode mobile terminal specific channels, and not the channels used for the virtual users, the splitting of the transmitted resources means that the decoding is made less complex. Thus, the method according to this aspect of the invention, involving separating the resources allocated for the mobile terminals under test and for the virtual users respectively into separate unities in the frequency domain, provides consistency to the test performance by applying the specified rule that implies a low complexity and constrain on the mobile terminals performing the test.

Here, the term "contiguous" has the meaning of a consecutive, i.e continuous, arrangement within each unity.

In a specific embodiment of the invention, the resources are split such that one or more contiguous unities of resources in the center of an available cell bandwidth are allocated to the one or more mobile terminals under test, and one or more contiguous unities of resources at the edges of said cell bandwidth are allocated to virtual users.

In another specific embodiment, the resources are split such that one or more contiguous unities of resources at the edges of said cell bandwidth are allocated to the one or more mobile terminals under test, and one or more contiguous unities of resources in the center of an available cell bandwidth are allocated to virtual users.

A second aspect of the invention relates to test apparatus for testing mobile terminals designed to operate in an OFDMA system. During testing, all or part of available downlink radio resources available in a cell of the OFDMA system are transmitted. In one exemplary embodiment, the test apparatus comprises a processing unit configured to split said radio resources into contiguous unities in the frequency domain such that one or more of said unities consists of resources allocated to the one or more UE under test and at least one of said unities consists of resources allocated to virtual users. The test apparatus may further include a transmitter operatively connected to the processing unit for transmitting test signals to said one or more mobile terminals on resources allocated to the mobile terminals and to the virtual users on radio resources allocated to said virtual users.

Rules governing virtual users to load cells could be specified in the standard for all tests and should be implemented in the test equipment. They may also be implemented in actual base stations for verifying operator specific or standardized tests in real network.

Thus, the test apparatus according to said second aspect of the invention may e.g. be an OFDM simulator for simulating an OFDM system or a radio base station capable of operating in an OFDM system, such as an eNodeB (Evolved NodeB).

Other objects, advantages and novel features of the invention will become apparent from the following detailed description of the invention when considered in conjunction with the accompanying drawings and claims.

BRIEF DESCRIPTION OF THE DRAWINGS

The foregoing and other objects, features and advantages of the invention will be apparent from the following detailed description of preferred embodiments as illustrated in the drawings.

DETAILED DESCRIPTION

The present invention can be exemplified in the following non-limiting description of embodiments of the invention.

Typically only a single mobile terminal, also known as a user equipment (UE) is tested at a time in a lab to verify that the UE under test meets the performance requirements. When test is performed in real network there can be one or multiple UE but in any case the entire cell resources are rarely used. Thus both in a lab or real network tests, the unused resources are transmitted to non existing virtual UEs to load the cell and to thereby mimic a realistic scenario seen in an actual network. The objective of this invention is to define rules, which can be used to transmit both test UE(s) and virtual UEs when verifying UE performance requirements in an OFDMA system. In order words, rules should define the split of OFDMA cell transmission resources between the test user(s) and the virtual users, also referred to as OFDM channel noise generator (OCNG) users. According to embodiments of the invention, resources allocated to the UE or UEs under test and the virtual users are split into contiguous unities. The UE (or UEs) under test does not decode OCNG channels, but only has to decode UE specific channels such as PDSCH and other UE specific channels, for example paging mapped on PDSCH. The objective of OCNG, i.e. virtual users, is only to load the cell in order to create realistic test environment, and not to add complexity to the decoding of UE specific channels e.g PDSCH. Such unnecessary complexity would put additional constraint on the UE that is not relevant for the test performance itself. For the test performance, it is desirable to isolate the test environment from influence that is not relevant for the test. Unnecessary complexity could cause such problems for the UE under test that the purpose of the test being lost, and thus the test would be of no use. Furthermore, randomly generated or distributed arrangement of resources allocated to the UE under test could also lead to inconsistent test results.

Figure 3:
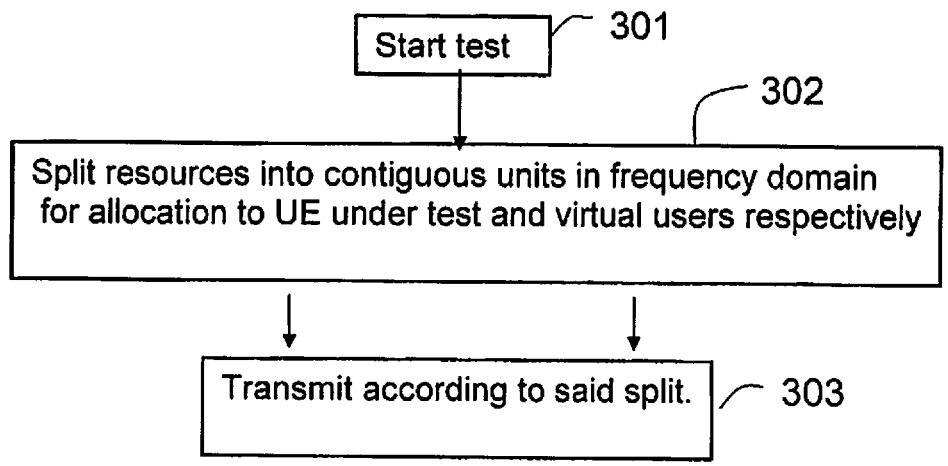
FIG. 3 illustrates a method according to a first embodiment of the invention.

FIG. 3 illustrates a method according to an embodiment of the invention, performed by a transmitting unit for example a base station or a system simulator. The test performance is started in step 301. In step 302, the resources to be transmitted in the test are split in the frequency domain such that certain contiguous unit or units is/are allocated to the UE or UEs under test, and certain other contiguous unit or units is/are allocated to virtual users, also referred to as OCNG users. The transmitting unit thereafter transmits according to said split, step 303.

The embodiments described in the following apply to verification tests in lab as well as those done in a real network.

According to an embodiment of the invention, all the available cell resources (i.e. in test equipment that mimics base station or an actual base station in case of real network test) are divided into three main groups: X, Y and Z. They are allocated as follows:

Group X resources are allocated to common channels, whose position in time and frequency domains are well specified. Examples of common channels are: SCH, PBCH, reference symbols, PCFICH, PDCCH etc Group Y resources are allocated to the test user(s).

Group Z resources are indeed OCNG and are allocated to virtual users, also called OCNG users.

Since common channel allocation is already well defined in the standard, the embodiments described herein will focus on how cell resources are split between group Y, i.e. resources allocated to the test users, and group Z, i.e. resources allocated to OCNG users.

In radio resource management (RRM) tests such as tests related to handover or cell reselection, typically two or more cells are used, where for instance one of the cells is a target cell. Group Y, i.e. the resources allocated to the test users, is in that case used for configuring UE via the initial or a serving cell. This means that as a special case the Y group can be zero in one or more of the cells involved in some RRM tests.

Figure 1:
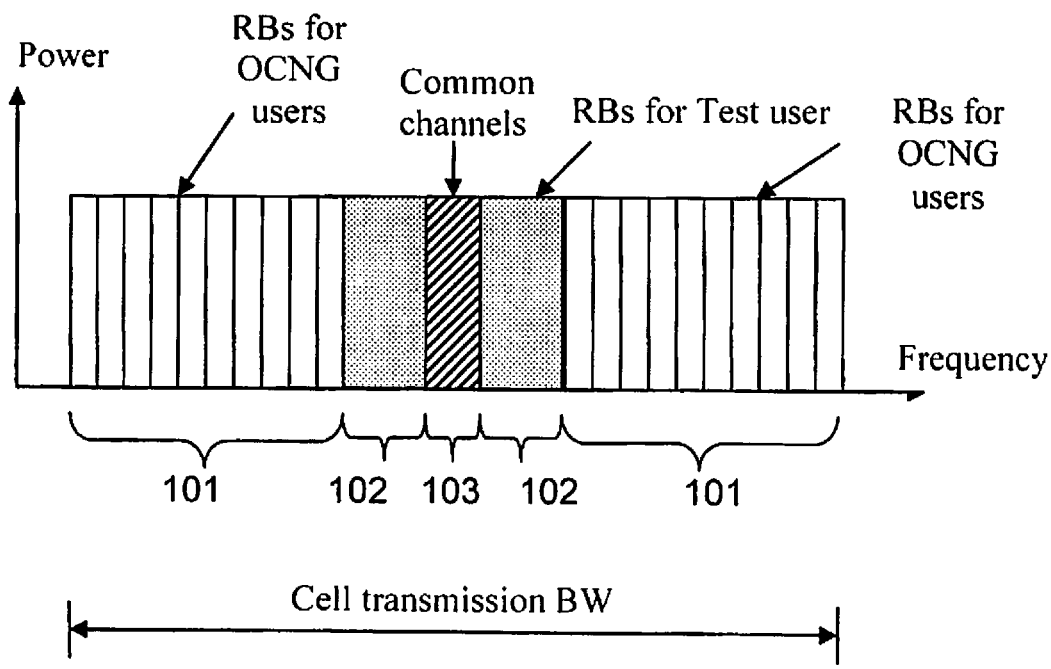
FIG. 1 illustrates an exemplary allocation of radio resources wherein resources at edges of cell transmission bandwidth are allocated to virtual users.
Figure 4:
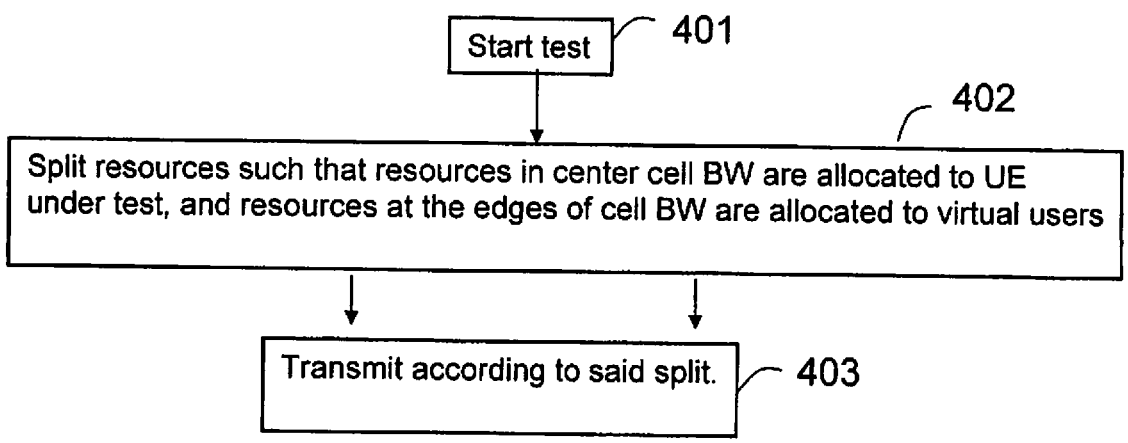
FIG. 4 illustrates a method according to a second embodiment of the invention.

According to one specific embodiment, the resources are allocated such that OCNG users are allocated resource blocks at the edges of the cell bandwidth, while the test user(s) is/are allocated resource blocks (i.e. group Y) in the middle of the cell transmission bandwidth in contiguous manner. Typically, the common channels such as SCH, PBCH, reference symbols, PCFICH, PDCCH are also located in the center of the bandwidth. Thus, the resource blocks allocated to the virtual users i.e. group Z, are arranged in contiguous unities in frequency domain at the edges of the cell bandwidth and scheduled and transmitted to OCNG users, i.e. virtual users. This arrangement is shown in FIG. 1. A method according to this embodiment, performed by a transmitting unit, for example a base station or a system simulator, is illustrated in FIG. 4. The test performance is started in step 401. In step 402, the resources to be transmitted in the test are split in the frequency domain such that a contiguous unit of resource blocks in the center of the cell bandwidth is allocated to the UE or UEs under test, while a contiguous unit of resource blocks at each edge of the cell bandwidth is allocated to virtual users, also referred to as OCNG users. The transmitting unit thereafter transmits according to said split of resources, step 403.

Figure 2:
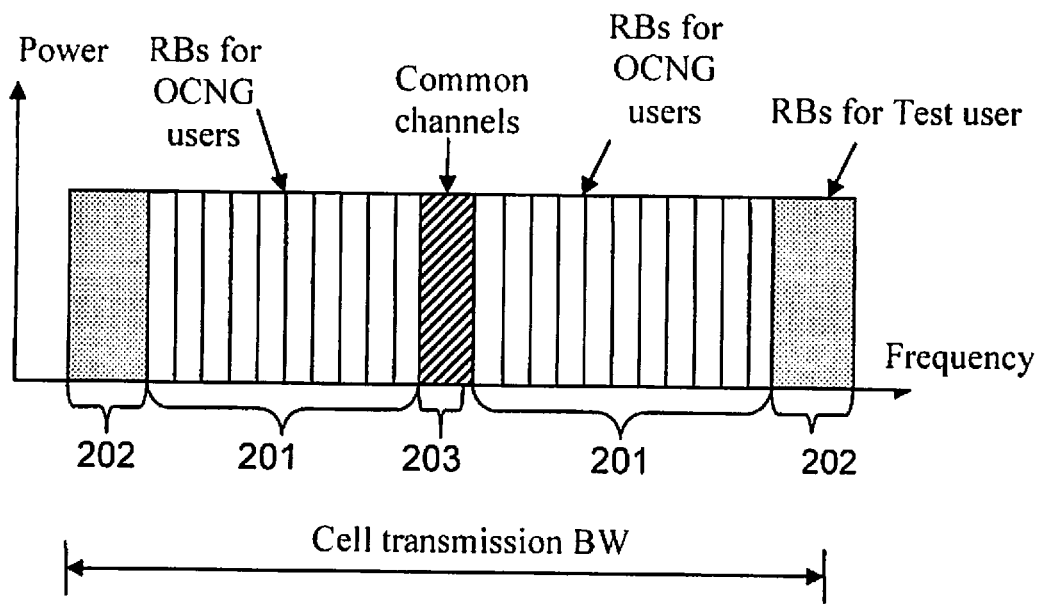
FIG. 2 illustrates an exemplary allocation of radio resources wherein radio resources in the center of cell transmission bandwidth are allocated to virtual users.
Figure 5:
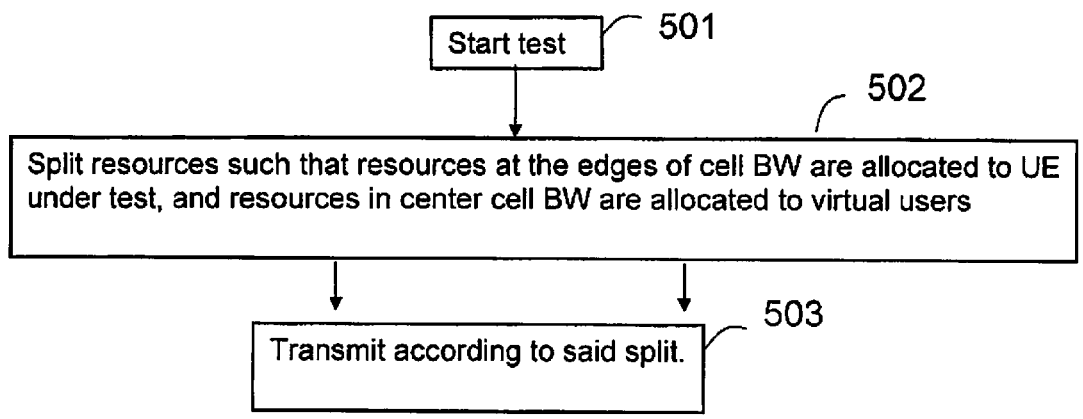
FIG. 5 illustrates a method according to a third embodiment of the invention.

According to an alternative specific embodiment, the resources are allocated such that OCNG users are allocated resource blocks in the middle of the cell bandwidth, while the test user(s) is/are allocated resource blocks (i.e. group Y) at one or both edges of the cell transmission bandwidth in contiguous manner. Thus, the resource blocks allocated to virtual users, i.e. group Z, are arranged in contiguous unities in frequency domain in the center of the cell bandwidth and are transmitted to OCNG users, i.e. virtual users when carrying out the test. This arrangement where OCNG is transmitted in center of the bandwidth is shown in FIG. 2. A method according to this embodiment, performed by a transmitting unit for example a base station or a system simulator, is illustrated in FIG. 5. The test performance is started in step 501. In step 502, the resources to be transmitted in the test are split in the frequency domain such that a contiguous unit of resource blocks at each edge of the cell bandwidth is allocated to the UE or UEs under test, while a contiguous unit of resource blocks in the center of the cell bandwidth is allocated to virtual users, also referred to as OCNG users. The transmitting unit thereafter transmits according to said split of resources, step 503.

The allocation of resource blocks between the test users and the virtual users may be fixed, for example such that 50% of all available resource blocks are allocated to the test user(s). For instance in case of 10 MHz bandwidth there are in total 50 RB, out of which 25 RB can be allocated to test user(s). In lab test there is typically only one user and therefore all 25 RB would be assigned to this user. In case of two or more test users the resource blocks can be equally split between the users or split with different proportion depending upon the type of information to be sent to these users. Dummy data may be transmitted in case the resources allocated to the UE under test are redundant for the test user. This will keep the number of resource blocks constant in group Y and make the test case more stable. The dummy data may comprise of some random sequences, which are stored in the test equipment and periodically sent to the virtual OCNG users.

In a specific arrangement there will be one resource block assigned per each individual OCNG user i.e. there will be as many OCNG users as the number of resource blocks in group Z. In the example above (10 MHz bandwidth) there should according to this rule be 25 OCNG users (i.e. 1 RB per OCNG user). A low bit rate data (e.g. voice service) can be transmitted to OCNG users. In another arrangement there can be fewer OCNG users than the number of resource blocks in group Z, whereby more than one resource block are allocated to each OCNG user. For instance in the above example, if we have five OCNG users, then five resource blocks are allocated to each OCNG user.

It should be noted that in specific embodiments, power can be different on different resource blocks due to power boosting on some channels to improve coverage. This may depend upon the specific test case.

Typically, QPSK could be used for the modulation of the OCNG transmission. However, depending upon the test also higher order modulation could be used. In a specific embodiment, the modulation used for resources allocated to the virtual users 604 is the same as used for the one or more UEs 603 under test.

In case MIMO (multiple transmit and receive antennas, transmit diversity, cyclic delay diversity, etc) is used, the OCNG can be transmitted from uncorrelated sources, i.e. uncorrelated transmit antennas. Alternatively depending upon the type of test the OCNG can use the same MIMO transmission method and the same correlation model which is used for data transmission to the test user.

Figure 6:
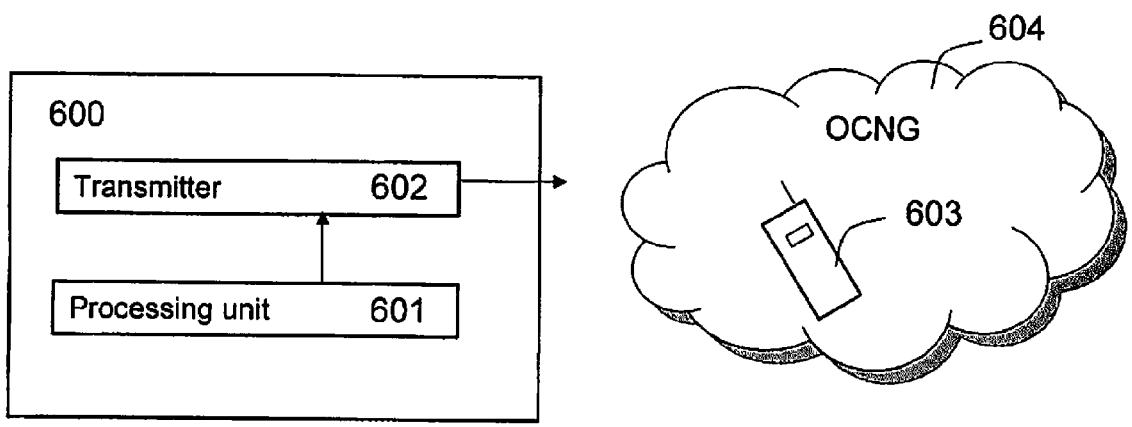
FIG. 6 illustrates a test apparatus capable of carrying out embodiments of the invention.

FIG. 6 illustrates schematically a transmitting unit 600, which can be a base station such as an eNodeB in the case where the test is performed in a real network, or a test equipment such as a system simulator in the case where the test is performed in a lab. For the sake of clarity, only units that are relevant for this invention are illustrated in this figure. A processing unit 601 is configured to split the resources to be used for transmission into contiguous unities in the frequency domain according to a specific rule, and a transmitter 602 is configured to transmit to the UE 603 under test and to virtual users 604, also referred to as OCNG users.

Thus, embodiments of the present invention provide the advantages that:
- The load generation in a test is simplified and testing complexity is reduced.
- The load generation in a base station such as an e-NodeB is simplified based on the rules above for load tests in real networks.
- Performance requirements can be properly verified since consistent rules for generating load in the cell are used in the tests since well defined load generation will allow easy distinction between the performance of good and bad UEs.

An implementation of the invention is exemplified in the following, which constitutes an example of how embodiments of the invention could be included in TS 36.133 version 8.4.0:

| OP.1 FDD: OCNG FDD Pattern 1 (outer resource blocks allocation) | | | | | | | | | | |
|---|---|---|---|---|---|---|---|---|---|---|
| | | Relative power level $\gamma_{PRB}$ [dB] | | | | | | | | |
| | | Subframe | | | | | | | | |
| Allocation | | 0 | | | 5 | | | 1-4, 6-9 | | |
| | | Control region OFDM symbols[Note 2] | | | | | | | | PDSCH |
| $n_{PRB}$ | CP length | 1 | 2 | 3 | 1 | 2 | 3 | 1 | 2 | 3 | Data |
| 0-12 | N | 0 | | | 0 | | | 0 | | | Note 1 |
| 37-49 | N | 0 | | | 0 | | | 0 | | | |

Note 1: Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.
Note 2: The control region consists of PCFICH, PHICH and PDCCH. Number of OFDM symbols belonging to the control region may vary between subframes.
N: Normal

TABLE A.3.2.1.2-1

| OP.2 FDD: OCNG FDD Pattern 2 (Full bandwidth allocation) | | | | | | | | | | |
|---|---|---|---|---|---|---|---|---|---|---|
| | | Relative power level $\gamma_{PRB}$ [dB] | | | | | | | | |
| | | Subframe | | | | | | | | |
| Allocation | | 0 | | | 5 | | | 1-4, 6-9 | | |
| | | Control region OFDM symbols[Note 2] | | | | | | | | PDSCH |
| $n_{PRB}$ | CP length | 1 | 2 | 3 | 1 | 2 | 3 | 1 | 2 | 3 | Data |
| 0-49 | N | 0 | | | 0 | | | 0 | | | Note 1 |

Note 1: Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.
Note 2: The control region consists of PCFICH, PHICH and PDCCH. Number of OFDM symbols belonging to the control region may vary between subframes.
N: Normal OP.1 TDD: OCNG TDD Pattern 1 (outer resource blocks allocation) for 5 ms downlink-to-uplink switch-point periodicity

| | | Relative power level $\gamma_{PRB}$ [dB] | | | | | | | | | |
|---|---|---|---|---|---|---|---|---|---|---|---|
| | | Subframe | | | | | | | | | |
| Allocation | | 0 | | | 5 | | | 3, 4, 8, 9[Note 2] | | 1, 6 | |
| | | Control region OFDM symbols[Note 3] | | | | | | | | | PDSCH |
| $n_{PRB}$ | CP length | 1 | 2 | 3 | 1 | 2 | 3 | 1 | 2 | 3 | 1 | 2 | Data |
| 0-12 | N | 0 | | | 0 | | | 0 | | | Table A.3.2.2.1-2 | | Note 1 |
| 37-49 | N | 0 | | | 0 | | | 0 | | | | | |

Note 1: Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.

Note 2: Subframes available for DL transmission depends on the Uplink-Downlink configuration defined in Table 4.2-2 in 3GPP TS 36.211 [16].

Note 3: The control region consists of PCFICH, PHICH and PDCCH. Number of OFDM symbols belonging to the control region may vary between subframes.

N: Normal

OP.1 TDD: OCNG TDD Pattern 1 ((outer resource blocks allocation) for special subframe configuration with 5 ms downlink-to-uplink switch-point periodicity

| Allocation | | Relative power level $\gamma_{PRB}$ [dB] Special subframe configuration | | | | | | | | | | | | | | | | |
|---|---|---|---|---|---|---|---|---|---|---|---|---|---|---|---|---|---|---|
| | | 0 | | 1 | | 2 | | 3 | | 4 | | 5 | | 6 | | 7 | | 8 |
| | | Control region OFDM symbols | | | | | | | | | | | | | | | | |
| $n_{PRB}$ | CP length | 1 | 2 | 1 | 2 | 1 | 2 | 1 | 2 | 1 | 2 | 1 | 2 | 1 | 2 | 1 | 2 | 1 | 2 |
| 0-12 | N | 0 | 0 | 0 | 0 | 0 | 0 | 0 | 0 | 0 | 0 | 0 | 0 | 0 | 0 | 0 | 0 | 0 | 0 |
| 37-49 | N | 0 | 0 | 0 | 0 | 0 | 0 | 0 | 0 | 0 | 0 | 0 | 0 | 0 | 0 | 0 | 0 | 0 | 0 |

Note 1: Special subframe configurations are defined in Table 4.2-1 in TS 36.211 [16].

TABLE A.3.2.2.2-1

OP.2 TDD: OCNG TDD Pattern 2 (full bandwidth allocation) for 5 ms downlink-to-uplink switch-point periodicity

| Allocation | | Relative power level $\gamma_{PRB}$ [dB] Subframe | | | | | | | | | | |
|---|---|---|---|---|---|---|---|---|---|---|---|---|
| | | 0 | | | 5 | | | 3, 4, 8, 9[Note 2] | | | 1, 6 | |
| | | Control region OFDM symbols[Note 3] | | | | | | | | | | PDSCH |
| $n_{PRB}$ | CP length | 1 | 2 | 3 | 1 | 2 | 3 | 1 | 2 | 3 | 1 | 2 | Data |
| 0-49 | N | 0 | | | 0 | | | 0 | | | Table A.3.2.2-2 | | Note 1 |

Note 1: Each physical resource block (PRB) is assigned to an individual virtual UE. The data for each virtual UE shall be uncorrelated with data from other virtual UEs over the period of any measurement. The data shall be QPSK modulated. The parameter $\gamma_{PRB}$ is used to scale the power of PDSCH.
Note 2: Subframes available for DL transmission depends on the Uplink-Downlink configuration in Table 4.2-2 in 3GPP TS 36.211 [16].
Note 3: The control region consists of PCFICH, PHICH and PDCCH. Number of OFDM symbols belonging to the control region may vary between subframes.
N: Normal OP.2 TDD: OCNG TDD Pattern 2 (full bandwidth allocation) for special subframe configuration with 5 ms downlink-to-uplink switch-point periodicity

| Allocation | | Relative power level $\gamma_{PRB}$ [dB] Special subframe configuration | | | | | | | | | | | | | | | | |
|---|---|---|---|---|---|---|---|---|---|---|---|---|---|---|---|---|---|---|
| | | 0 | | 1 | | 2 | | 3 | | 4 | | 5 | | 6 | | 7 | | 8 |
| | | Control region OFDM symbols | | | | | | | | | | | | | | | | |
| $n_{PRB}$ | CP length | 1 | 2 | 1 | 2 | 1 | 2 | 1 | 2 | 1 | 2 | 1 | 2 | 1 | 2 | 1 | 2 | 1 | 2 |
| 0-49 | N | 0 | 0 | 0 | 0 | 0 | 0 | 0 | 0 | 0 | 0 | 0 | 0 | 0 | 0 | 0 | 0 | 0 | 0 |

Note 1: Special subframe configurations are defined in Table 4.2-1 in 3GPP TS 36.211 [16].

The abbreviations used in the specification have the following meanings:
OFDM: Orthogonal Frequency Division Multiplexing
OFDMA: Orthogonal Frequency Division Multiple Access
WCDMA: Wide band code division multiple access
UE: User Equipment
OCNS: Orthogonal channel noise simulator
OCNG: OFMA channel noise generator
SCH: Synchronisation Channel
PBCH: Physical Broadcast Channel
PCFICH: Physical Control Format Indicator Channel
PDCCH: Physical Downlink Control Channel
RB: Resource Block
QPSK: Quadrature Phase Shift Keying The present invention may, of course, be carried out in other ways than those specifically set forth herein without departing from essential characteristics of the invention. The present embodiments are to be considered in all respects as illustrative and not restrictive.

What is claimed is:

1. A method for testing OFDM mobile terminals, said method comprising:
    splitting radio resources available in a cell of an OFDM system into contiguous unities in the frequency domain, wherein one or more of said unities comprises radio resources allocated to one or more mobile terminals being tested and wherein at least one of said unities comprises radio resources allocated to virtual users; and
    transmitting test signals to said one or more mobile terminals on radio resources allocated to the mobile terminals and to the virtual users on radio resources allocated to said virtual users.

2. The method according to claim 1 wherein splitting radio resources available in a cell of an OFDM system into contiguous unities in the frequency domain comprises splitting the radio resources such that one or more contiguous unities of radio resources in the center of an available cell bandwidth are allocated to the one or more mobile terminals under test, and one or more contiguous unities of radio resources at the edges of said cell bandwidth are allocated to virtual users.

3. The method according to claim 1 wherein splitting radio resources available in a cell of an OFDM system into contiguous unities in the frequency domain comprises splitting the radio resources such that one or more contiguous unities of radio resources at the edges of said cell bandwidth are allocated to the one or more mobile terminals under test, and one or more contiguous unities of radio resources in the center of an available cell bandwidth are allocated to virtual users.

4. The method according to claim 1 further comprising allocating one resource block out of the contiguous unities of radio resources available for the virtual users to each of the said virtual users.

5. The method according to claim 1 wherein transmitting test signals to said virtual users on radio resources allocated to the virtual users comprises transmitting QPSK modulated signals to the virtual users on radio resources allocated to the virtual users.

6. The method according to claim 1 wherein transmitting test signals to said virtual users on radio resources allocated to the virtual users comprises transmitting test signals to the virtual users from two or more uncorrelated transmit antennas.

7. The method according to claim 1 wherein transmitting test signals to said virtual users on radio resources allocated to the virtual users comprises transmitting test signals according to the same MIMO transmission method and using same correlation model as used for the one or more mobile terminals under test.

8. The method according to claim 1 wherein the allocation of radio resources to the one or more mobile terminals under test and the virtual users respectively is fixed.

9. The method according to claim 1 wherein transmitting test signals to said one or more mobile terminals on radio resources allocated to the mobile terminals comprises the step of transmitting PDSCH signals as test signals on radio resources allocated for the one or more mobile terminals.

10. The method according to claim 1 carried out by an OFDMA simulator capable of simulating an OFDMA system.

11. The method according to claim 1 carried out by a base station capable of operating in an OFDMA system.

12. A test apparatus for testing mobile terminals in an OFDMA system, said test apparatus comprising:
a processing unit configured to split radio resources in an OFDMA cell into contiguous unities in the frequency domain, wherein one or more of said unities comprise radio resources allocated to one or more mobile terminals being tested and wherein at least one of said unities comprise radio resources allocated to virtual users; and
a transmitter operatively connected to said processing unit for transmitting test signals to said one or more mobile terminals on radio resources allocated to the mobile terminals and to the virtual users on radio resources allocated to said virtual users.

13. The test apparatus according to claim 12 wherein said processing unit is configured to split the radio resources such that one or more contiguous unities of radio resources in the center of an available cell bandwidth are allocated to the one or more mobile terminals under test, and one or more contiguous unities of radio resources at the edges of said cell bandwidth are allocated to virtual users.

14. The test apparatus according to claim 12, wherein said processing unit is configured to split the radio resources such that one or more contiguous unities of radio resources at the edges of said cell bandwidth are allocated to the one or more mobile terminals under test, and one or more contiguous unities of radio resources in the center of an available cell bandwidth are allocated to virtual users.

15. The test apparatus according to claim 12 wherein said processing unit is configured to allocate one resource block out of the contiguous unities of radio resources available for the virtual users to each of the said virtual users.

16. The test apparatus according to claim 12 wherein said processing unit is configured to use QPSK modulation for test signals transmitted on radio resources allocated to the virtual users.

17. The test apparatus according to claim 12 wherein the processing unit and transmitter are configured to transmit test signals to the virtual users via two or more uncorrelated transmit antennas to simulate MIMO operations.

18. The test apparatus according to claim 12 wherein the processing unit and transmitter are configured to transmit test signals to the virtual users using the same MIMO transmission method and the same correlation model as used for the one or more mobile terminals under test to simulate MIMO operations.

19. The test apparatus according to claim 12 wherein the processing unit is configured to allocate radio resources to the one or more mobile terminals under test and the virtual users in a fixed manner.

20. The test apparatus according to claim 12 wherein the processing unit and transmitter are configured to transmit PDSCH signals as test signals on radio resources allocated to the one or more mobile terminals under test.

21. The test apparatus according to claim 12 wherein said test apparatus comprises an OFDMA simulator capable of simulating an OFDMA system.

22. The test apparatus according to claim 12 wherein said test apparatus comprises a base station capable of operating in an OFDMA system.

* * * * *

UNITED STATES PATENT AND TRADEMARK OFFICE
CERTIFICATE OF CORRECTION

PATENT NO. : 8,411,553 B2
APPLICATION NO. : 12/472430
DATED : April 2, 2013
INVENTOR(S) : Kazmi et al.

It is certified that error appears in the above-identified patent and that said Letters Patent is hereby corrected as shown below:

In the Specification

In Columns 9 & 10, Line 1, delete "1 ((outer" and insert -- 1 (outer --, therefor.

Signed and Sealed this
Twenty-second Day of October, 2013

Teresa Stanek Rea
*Deputy Director of the United States Patent and Trademark Office*